(12) United States Patent
Kato et al.

(10) Patent No.: US 7,383,942 B2
(45) Date of Patent: Jun. 10, 2008

(54) ARTICLE CARRYING APPARATUS

(75) Inventors: Heizaburo Kato, Shizuoka (JP); Toshinao Kato, Shizuoka (JP)

(73) Assignee: Sankyo Seisakusho Co., Tokyo (JP)

( * ) Notice: Subject to any disclaimer, the term of this patent is extended or adjusted under 35 U.S.C. 154(b) by 280 days.

(21) Appl. No.: 11/259,895

(22) Filed: Oct. 26, 2005

(65) Prior Publication Data
US 2006/0096840 A1      May 11, 2006

(30) Foreign Application Priority Data
Oct. 27, 2004   (JP)   .............................. 2004-313001

(51) Int. Cl.
*B65G 27/02*   (2006.01)
*B65G 27/12*   (2006.01)
(52) U.S. Cl. ....................... 198/757; 198/760; 198/767
(58) Field of Classification Search ................ 198/757, 198/760, 767
See application file for complete search history.

(56) References Cited

U.S. PATENT DOCUMENTS

| | | | | |
|---|---|---|---|---|
| 3,315,793 A | * | 4/1967 | Yakubovich | 198/760 |
| 3,788,449 A | * | 1/1974 | Baberowski et al. | 198/757 |
| 4,362,455 A | * | 12/1982 | Hirose | 198/757 |
| 4,530,431 A | * | 7/1985 | Spurlin | 198/534 |
| 5,178,258 A | | 1/1993 | Smalley et al. | |
| 5,351,807 A | * | 10/1994 | Svejkovsky | 198/750.8 |
| 6,651,807 B2 | * | 11/2003 | Baird et al. | 198/757 |
| 7,143,891 B2 | * | 12/2006 | Kumeth | 198/757 |

FOREIGN PATENT DOCUMENTS

| | | | |
|---|---|---|---|
| EP | 644134 A1 | * | 3/1995 |
| EP | 1 279 627 A1 | | 1/2003 |
| JP | 2003-40423 | | 2/2003 |

OTHER PUBLICATIONS

European Search Report dated Mar. 6, 2006.
Office Action mailed Oct. 27, 2006 in the Korean Patent Application No. 10-2005-0099651 corresponding to the U.S. Appl. No. 11/259,895 (pp. 4—two-page English translation of the Office Action, and two-page Korean language Office Action).

* cited by examiner

*Primary Examiner*—Mark A Deuble
(74) *Attorney, Agent, or Firm*—John J. Penny, Jr.; Edwards Angell Palmer & Dodge LLP

(57) ABSTRACT

An article carrying apparatus is capable of inhibiting a force that acts on the apparatus due to vibration being applied to its carry section in order to carry an article. The article carrying apparatus includes: a carry section for restricting, to a circumferential direction, a carrying direction in which an article is carried; a cam mechanism to which a driving force is input from an input shaft and that is for applying a vibration to the carry section by transmitting, to the carry section, an oscillating motion having at least a circumferential direction component in the circumferential direction, wherein the vibration causes the article to be carried in the circumferential direction; and a balancer for inhibiting a force that acts on the input shaft due to the cam mechanism applying the vibration to the carry section.

9 Claims, 12 Drawing Sheets view from arrow direction C

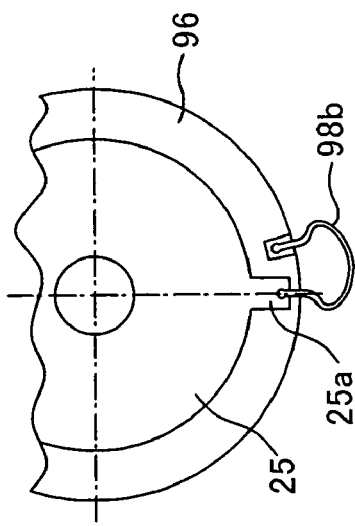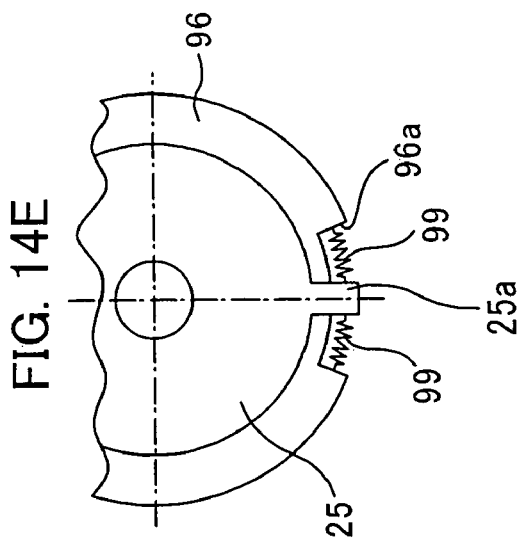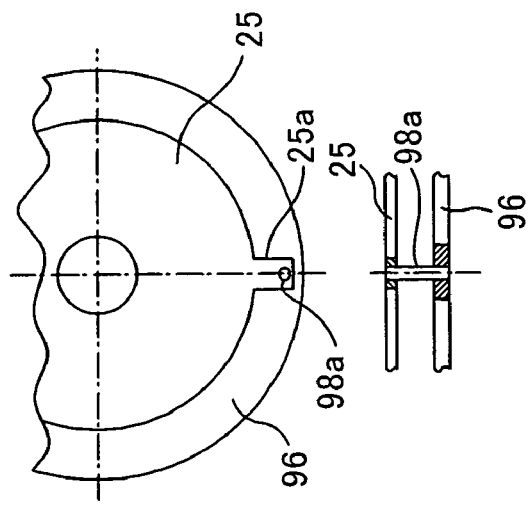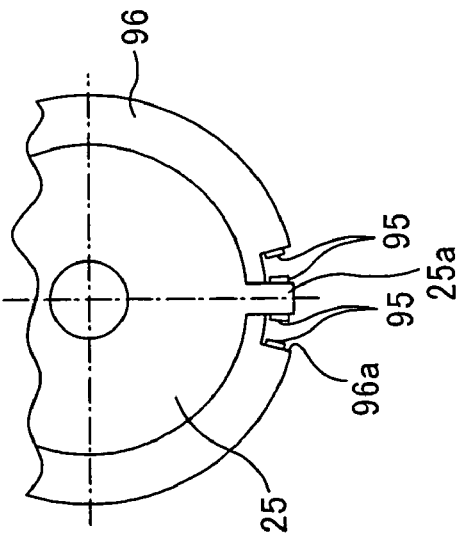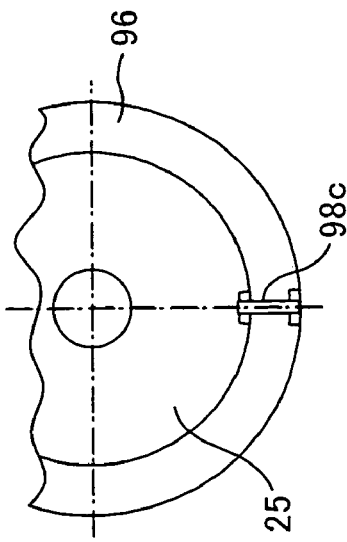

ARTICLE CARRYING APPARATUS

CROSS-REFERENCE TO RELATED APPLICATIONS

The present application claims priority upon Japanese Patent Application No. 2004-313001 filed on Oct. 27, 2004, which is incorporated herein by reference.

BACKGROUND OF THE INVENTION

1. Field of the Invention

The present invention relates to article carrying apparatuses.

2. Description of the Related Art

Conventionally, various types of article carrying apparatuses for lining up articles, such as bulk components, in rows while carrying them, and supplying the articles one at a time have been proposed. Such article carrying apparatuses are generally called "feeders," and various types of feeders exist, including vibration- and belt-type feeders, although vibration-type feeders are the most common. A vibration-type feeder is an apparatus for carrying an article placed on a carry section, which vibrates, by utilizing for example the phenomenon of relative sliding of the article with respect to the carry section.

One example of such a vibration-type feeder is a rotary feeder that carries articles along a circumferential direction. This rotary feeder, for example, has, on its input shaft, a first cam that causes the carry section to oscillate in the circumferential direction and a second cam that causes the carry section to perform reciprocating motion in the vertical direction, and when the input shaft rotates, the carry section is caused to perform oscillating motion in the circumferential direction by the first cam and to perform linear motion in the vertical direction by the second cam. At this time, the articles are made to moved in the carrying direction by causing the carry section to oscillate at a uniform velocity in the direction in which the articles are carried, and by changing the movement of the carry section in the vertical direction from downward movement to upward movement so that the friction between the article and the carry section is increased. On the other hand, when the carry section moves in the reverse direction of the carrying direction of the articles, the carry section is accelerated and decelerated rapidly in the reverse direction, and the movement of the carry section in the vertical direction is changed from upward movement to downward movement so that the friction between the article and the carry section is reduced, and thus the articles are caused to slide over the carry section (see, JP 2003-40423A, for example).

In the conventional rotary feeder described above, carrying of the articles is achieved by vibrating the carry section. Consequently, the vibration of the carry section is also transmitted to a housing via a cam mechanism, which is a driving section for vibrating the carry section. That is, even when the rotary feeder itself has the ability to carry the articles properly, there is a risk that the articles may not be carried properly because the housing vibrates. For example, when the rotary feeder is placed on a table or the like having low rigidity, the vibration transmitted to the housing is amplified by the table and causes the rotary feeder itself placed thereon to vibrate significantly, and thus there is a risk that the articles may not be carried properly. Moreover, there also is a risk that noise may occur because of vibration of the table or the housing.

SUMMARY OF THE INVENTION

The present invention was arrived at in light of these issues of the conventional art, and it is an object thereof to provide an article carrying apparatus that is capable of inhibiting a force that acts on the apparatus due to vibration being applied to the carry section in order to carry the article.

A main invention for achieving the object is an article carrying apparatus including: a carry section for restricting, to a circumferential direction, a carrying direction in which an article is carried; a cam mechanism to which a driving force is input from an input shaft and that is for applying a vibration to the carry section by transmitting, to the carry section, an oscillating motion having at least a circumferential direction component in the circumferential direction, wherein the vibration causes the article to be carried in the circumferential direction; and a balancer for inhibiting a force that acts on the input shaft due to the cam mechanism applying the vibration to the carry section.

Features of the present invention other than the above will become clear by reading the description of the present specification with reference to the accompanying drawings.

BRIEF DESCRIPTION OF THE DRAWINGS

For more complete understanding of the present invention and the advantages thereof, reference is now made to the following description taken in conjunction with the accompanying drawings wherein:

FIG. 14A is a diagram showing a variant example in which a projecting arm of an output section and the weight are connected vertically by a bar-like, elastic member, FIG. 14B is a diagram showing a variant example in which the projecting arm of the output section and the weight are connected by a steel material formed in a shape that is susceptible to elastic deformation, FIG. 14C is a diagram showing a variant example in which the output section and the weight are connected in the diametrical direction by an elastic member, FIG. 14D is a diagram showing a variant example utilizing the repulsion between magnets, and FIG. 14E is a diagram showing a variant example in which helical compression springs are disposed on both sides of the projecting arm of the output section in the circumferential direction and interposed between the projecting arm and the faces of a recess of the weight with a compressive force applied to each spring.

DETAILED DESCRIPTION OF THE INVENTION

Figure 1A:
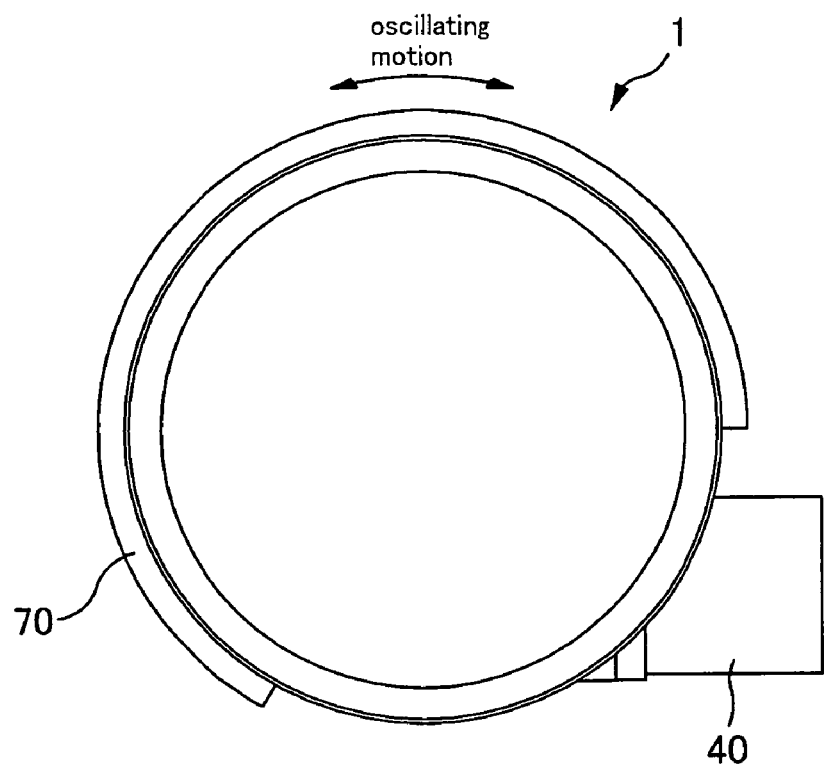
FIG. 1A is an external plan view of an article carrying apparatus.

At least the following matters will be made clear by the explanation in the present specification and the description of the accompanying drawings.

An aspect of the invention is an article carrying apparatus including: a carry section for restricting, to a circumferential direction, a carrying direction in which an article is carried; a cam mechanism to which a driving force is input from an input shaft and that is for applying a vibration to the carry section by transmitting, to the carry section, an oscillating motion having at least a circumferential direction component in the circumferential direction, wherein the vibration causes the article to be carried in the circumferential direction; and a balancer for inhibiting a force that acts on the input shaft due to the cam mechanism applying the vibration to the carry section.

With such an article carrying apparatus, the force that acts on the input shaft when vibration is applied to the carry section in order to carry the article can be inhibited by the balancer. That is, the force that acts on the input shaft when vibration is applied to the carry section is reduced, and thus the input shaft is less prone to vibration. Consequently, vibration that causes the entire article carrying apparatus to vibrate is inhibited, and the article can be carried properly, and furthermore, generation of noise due to vibration also can be inhibited.

In this article carrying apparatus, it is preferable that the balancer is a mechanism in which a weight having a predetermined mass performs an oscillating motion in a direction opposite to the oscillating motion of the carry section.

With such an article carrying apparatus, the weight having a predetermined mass of the balancer is oscillated in the opposite direction from the oscillating motion of the carry section, so that the carry section and the weight move in opposite directions, and forces respectively resulting from the movement of the carry section and the weight at that time are cancelled by each other. That is, the force resulting from the movement of the weight acts to cancel the force resulting from the movement of the carry section, and thus the force that acts on the input shaft when vibration is applied to the carry section can be inhibited reliably.

In this article carrying apparatus, it is preferable that the cycle of the oscillating motion of the carry section matches with the cycle of the oscillating motion of the weight.

With such an article carrying apparatus, even when the carry section and the weight perform oscillating motion repeatedly, the cycle of the carry section matches with the cycle of the weight, so that vibration can be inhibited continuously even when the article carrying apparatus is operated continuously.

In this article carrying apparatus, it is preferable that a driving force for driving the balancer is input from the input shaft.

With such an article carrying apparatus, the balancer can be operated by rotating the input shaft for inputting the driving force to the cam mechanism for causing the carry section to perform oscillating motion. That is, it is not necessary to provide separately an input section for the driving force for operating the balancer, and the balancer can be operated with a simple configuration. In particular, the phases of the oscillating motion of the carry section and the oscillating motion of the balancer have to be matched in order to make the carry section and the balancer oscillate in opposite directions; because the balancer is driven by the input shaft of the cam mechanism that drives the carry section, the phases of the oscillating motion of the carry section and the oscillating motion of the balancer can be matched easily and appropriately. Furthermore, since the force resulting from the oscillating motion of the carry section and the force resulting from the oscillating motion of the weight independently act on the input shaft, these forces cancel each other, thereby allowing the force that acts on the input shaft when vibration is applied to the carry section to be inhibited reliably.

In this article carrying apparatus, it is preferable that the input shaft has a pair of cams provided with a spacing therebetween in an axial direction of the input shaft, each of the cams having two types of cam faces; and, of the four cam faces of the pair of cams, two cam faces facing outward in the axial direction are respectively in contact with cam followers provided to the carry section, and two cam faces facing inward in the axial direction are in contact with a cam follower provided to the balancer.

With such an article carrying apparatus, the carry section is oscillated while the two outward-facing cam faces of the pair of cams provided with a spacing in the axial direction of the input shaft are respectively in contact with the cam followers provided to the carry section, so that a cam constituted by the two cam faces is sandwiched between the two cam followers. Thus, the carry section can be oscillated with high precision by a cam mechanism that does not lead to occurrence of backlash. Moreover, the two inward-facing cam faces of the pair of cams are in contact with the cam follower provided to the weight, so that the cam follower provided to the balancer is sandwiched between the two cam faces. Thus, the weight can be oscillated with high precision by a cam mechanism that does not lead to occurrence of backlash. That is, vibration due to backlash does not occur neither when the carry section oscillates nor when the weight oscillates, and the timings of the oscillating operation of the carry section and the oscillating operation of the weight can be synchronized correctly. Furthermore, since the two cam mechanisms are configured to share the pair of cams, the size of the cam mechanisms can be reduced.

In this article carrying apparatus, it is preferable that the article carrying apparatus includes an other cam mechanism for applying a vibration to the carry section by transmitting, to the carry section, a reciprocating motion having at least a vertical direction component.

With such an article carrying apparatus, the carry section is caused to perform reciprocating motion in the vertical direction by an other cam mechanism, and thus it is possible to change the normal force exerted on the carry face of the carry section by the article when the article is carried. For this reason, it is possible to carry the article efficiently by changing the friction between the article and the carry face.

In this article carrying apparatus, it is preferable that a driving force for driving the other cam mechanism is input from the input shaft.

With such an article carrying apparatus, it is possible to cause the carry section to perform reciprocating motion in the vertical direction by rotating the input shaft for inputting the driving force to the cam mechanism for causing the carry section to perform oscillating motion. That is, it is not necessary to provide separately an input section for the driving force for causing the carry section to perform reciprocating motion in the vertical direction, and the carry section can be caused to perform reciprocating motion in the vertical direction with a simple configuration. Moreover, since the driving forces for the oscillating motion and the reciprocating motion of the carry section are input from the same input shaft, the timings of the oscillating motion and the reciprocating motion of the carry section can be tuned easily and appropriately, and thus the article can be carried efficiently.

In this article carrying apparatus, it is preferable that the article carrying apparatus includes an inhibitory member for inhibiting an inertial force resulting from the oscillating motion of the carry section and an inertial force resulting from the oscillating motion of the weight.

With such an article carrying apparatus, the inertial force resulting from the oscillating motion of the carry section and the inertial force resulting from the oscillating motion of the weight are inhibited by the inhibitory member, and thus each inertial force can be inhibited. For this reason, the driving forces for driving the respective components in opposite directions, that is, the driving force for causing the carry section to perform oscillating motion and the driving force for causing the weight to perform oscillating motion can be reduced.

That is, if the inhibitory member is not provided, when the moving directions of the oscillating motion of the carry section and the oscillating motion of the weight are reversed, the inertial forces that act in opposite directions become the greatest. At this time, when employing a configuration in which the driving forces for the oscillating motion of the carry section and the oscillating motion of the weight are input from, for example, the same input shaft, a considerable amount of driving force is required when, and before and after, the oscillating directions are reversed, and thus there is a risk that the size of the entire apparatus including the drive source may be increased. For this reason, by employing a configuration including the inhibitory member for inhibiting the inertial force resulting from the oscillating motion of the carry section and the inertial force resulting from the oscillating motion of the weight, the maximum driving force to be required can be reduced, and thus the size of the apparatus can be reduced.

In this article carrying apparatus, it is preferable that the inhibitory member is provided between the carry section and the weight, and is an elastic member for generating a force that acts on the carry section and the weight according to a relative displacement of the carry section and the weight.

With such an article carrying apparatus, when a predetermined position of the carry section and a predetermined position of the weight are displaced relative to the other in such a direction that the distance therebetween is increased, the elastic member provided between the carry section and the weight is extended in conjunction with this relative displacement and acts to pull the carry section and the weight closer to each other; whereas when the predetermined position of the carry section and the predetermined position of the weight are displaced relative to the other in such a direction that the distance therebetween is decreased, the elastic member provided between the carry section and the weight is compressed in conjunction with this relative displacement and acts to pull the carry section and the weight apart. For this reason, when the distance between the predetermined position of the carry section and the predetermined position of the weight is maximized and when that distance is minimized, in which cases the driving force is most required, the force that works in such a direction that the predetermined position of the carry section and the predetermined position of the weight are returned to their original positions becomes greatest, and thus the inertial force resulting from the oscillating motion of the carry section and the inertial force resulting from the oscillating motion of the weight can be inhibited efficiently.

In this article carrying apparatus, it is preferable that the article carrying apparatus is configured so that a center of oscillation of the oscillating motion of the carry section and a center of oscillation of the oscillating motion of the weight are concentric, and the inhibitory member acts in a circumference of a circle whose center matches with the center of oscillation.

With such an article carrying apparatus, both the inertial force resulting from the oscillating motion of the carry section and the inertial force resulting from the oscillating motion of the weight act within the circumference of a circle whose center matches with the center of oscillation. Therefore, forces that act in directions other than the circumferential direction are prevented from occurring by having the inhibitory member act in the circumference of a circle whose center is the center of oscillation, and thus it is possible to prevent occurrence of unwanted vibrations and to vibrate the carry section reliably and efficiently.

According to the present invention, the force that acts on the apparatus when vibration is applied to the carry section in order to carry the article, can be inhibited.

Configuration of Apparatus

Figure 1B:
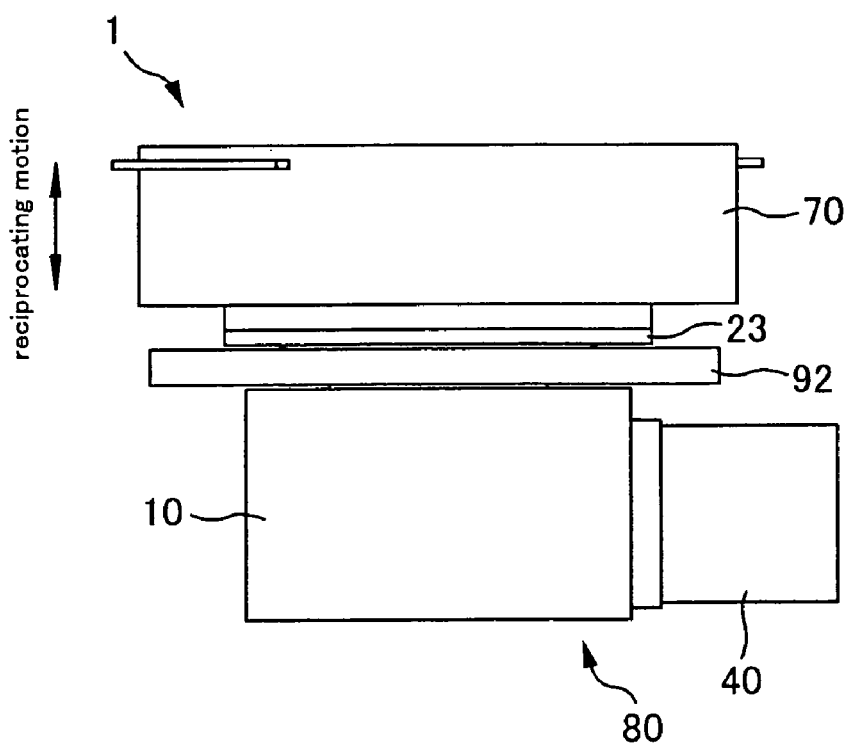
FIG. 1B is an external front view of FIG. 1A.
Figure 2:
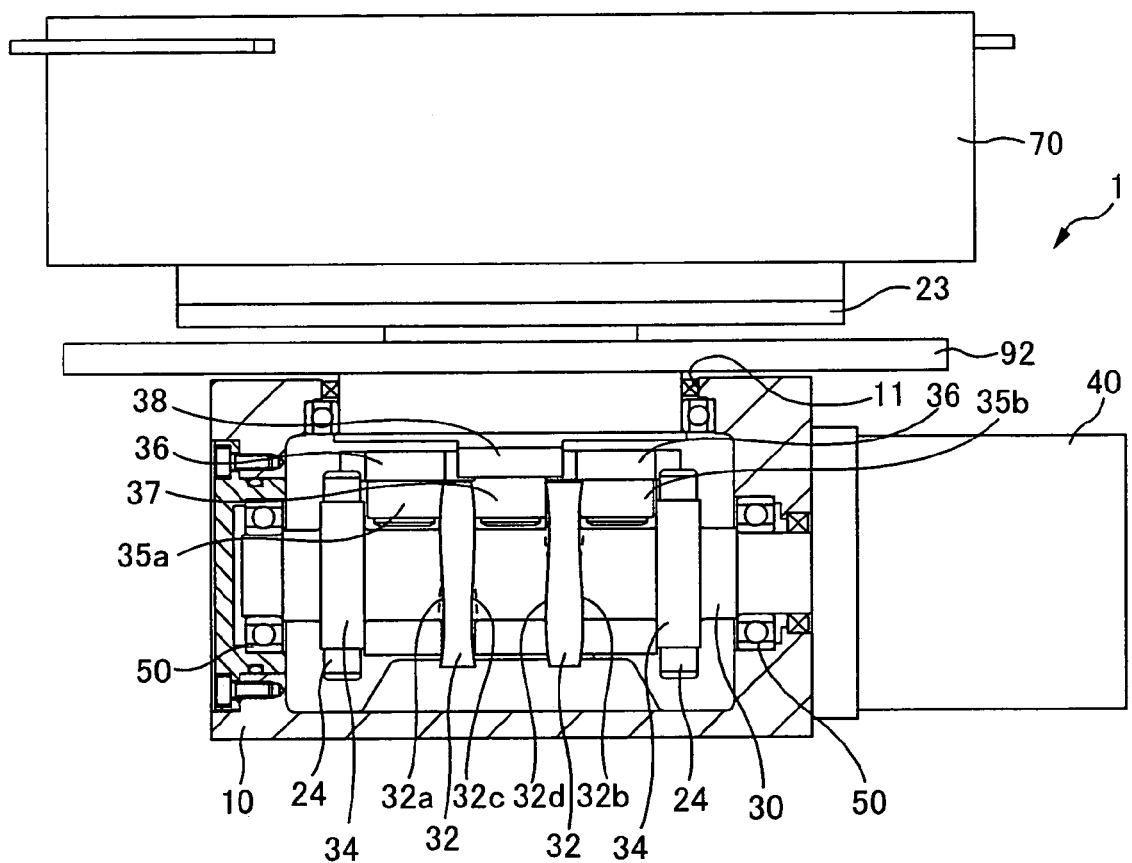
FIG. 2 is a vertical sectional view for explaining the inside of a carry driving section.
Figure 3:
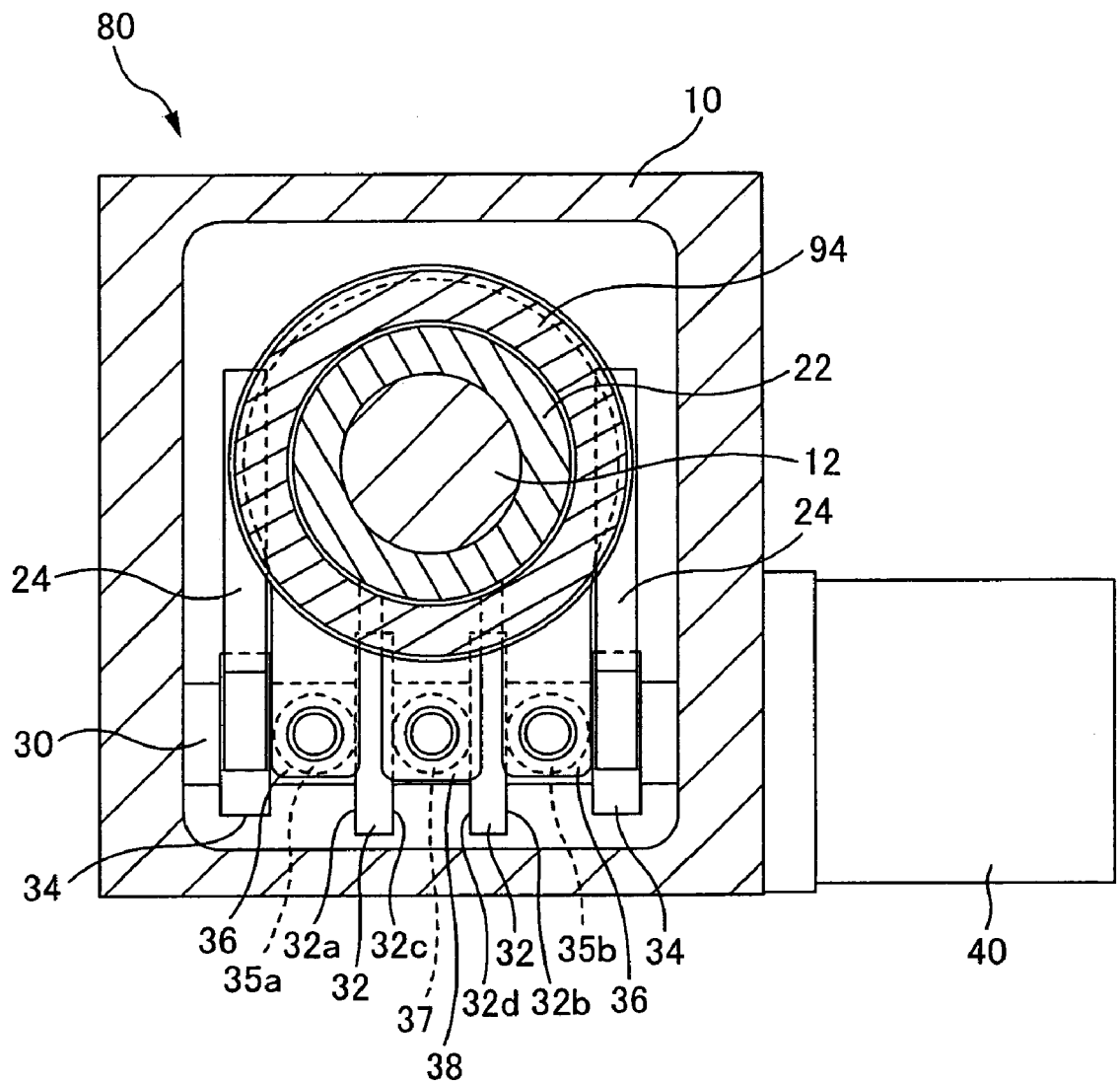
FIG. 3 is a horizontal cross-sectional view for explaining the inside of the carry driving section.
Figure 4:
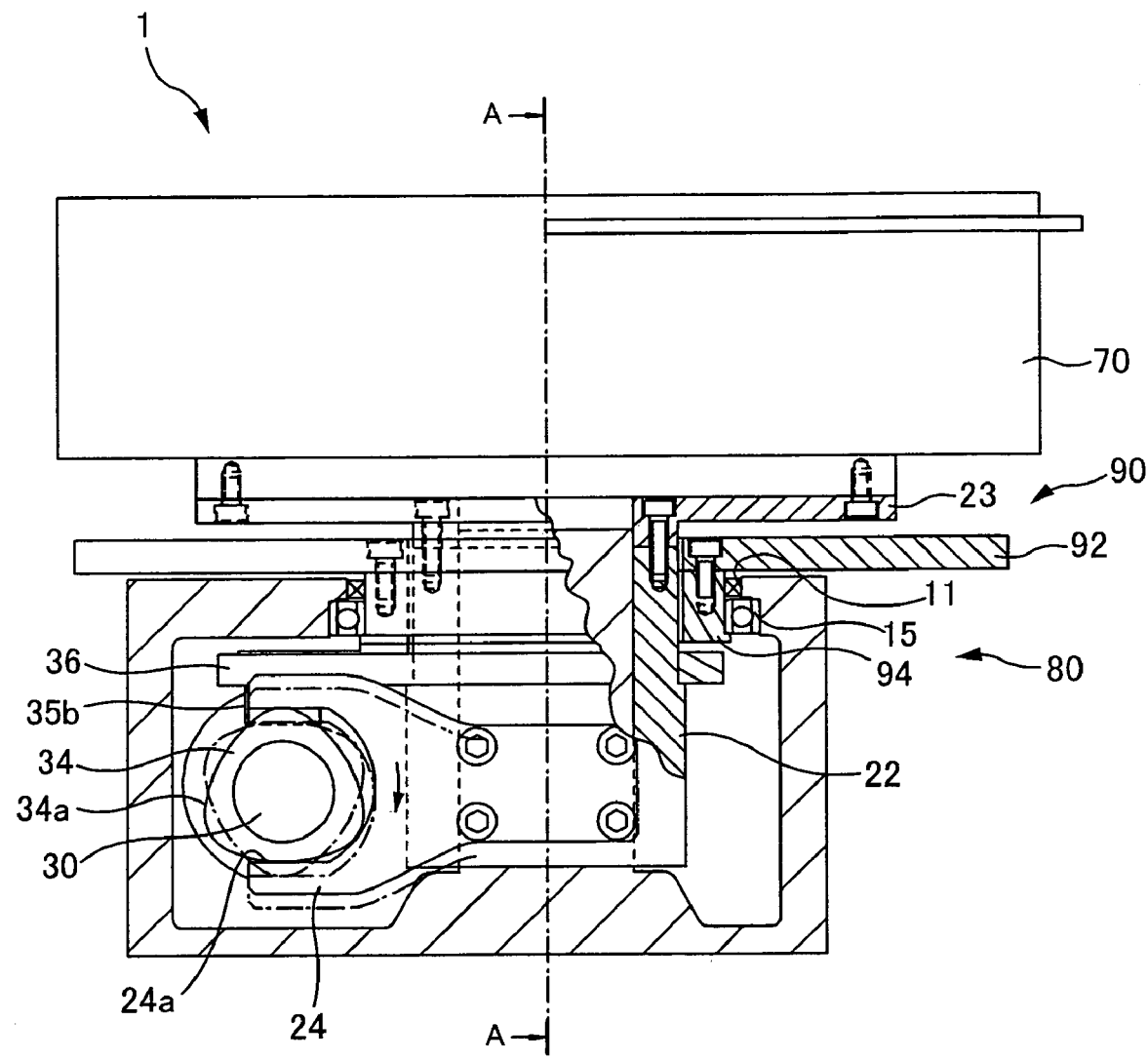
FIG. 4 is a vertical sectional view for explaining a cam mechanism for causing a carry section to reciprocate.
Figure 5:
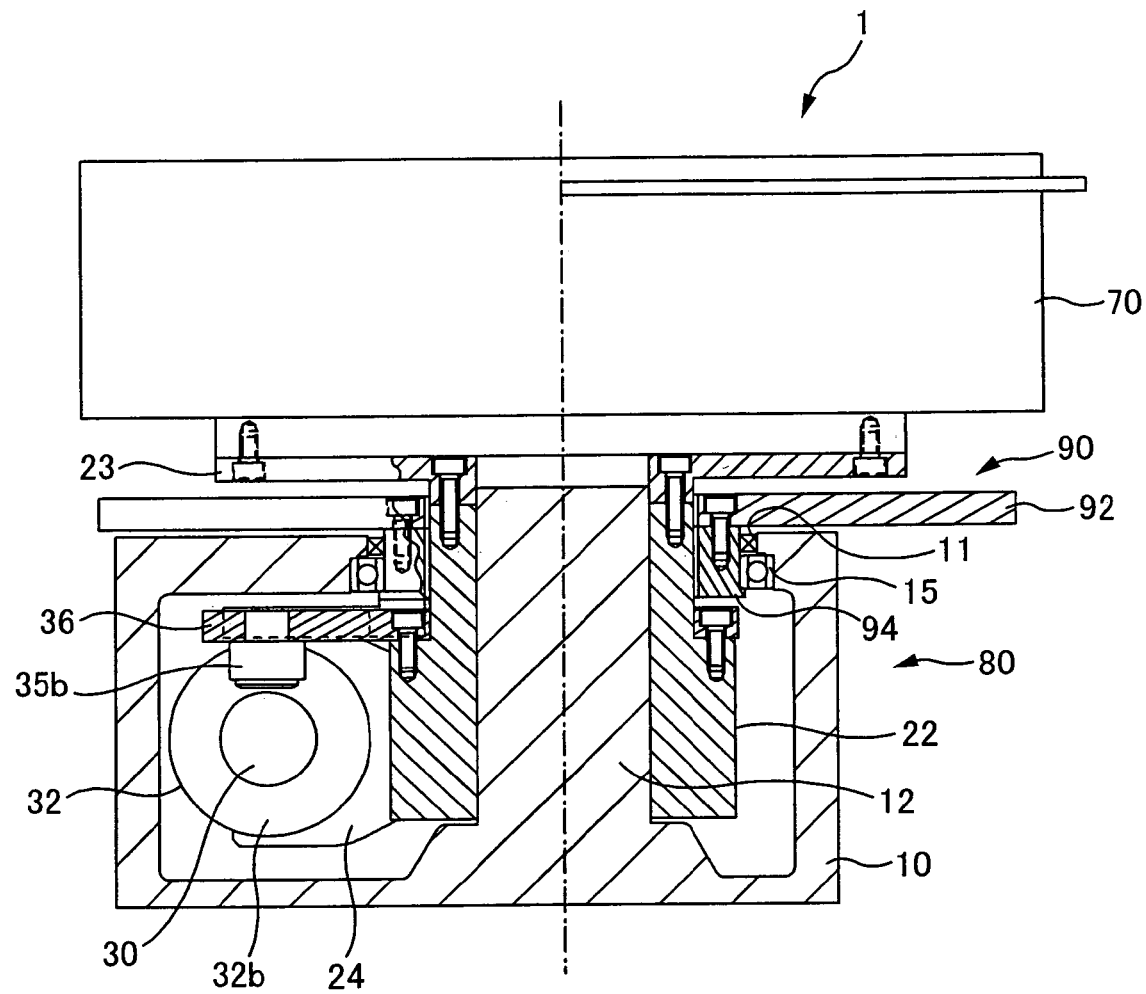
FIG. 5 is a cross-sectional view for explaining a cam mechanism for causing the carry section to oscillate.
Figure 6:
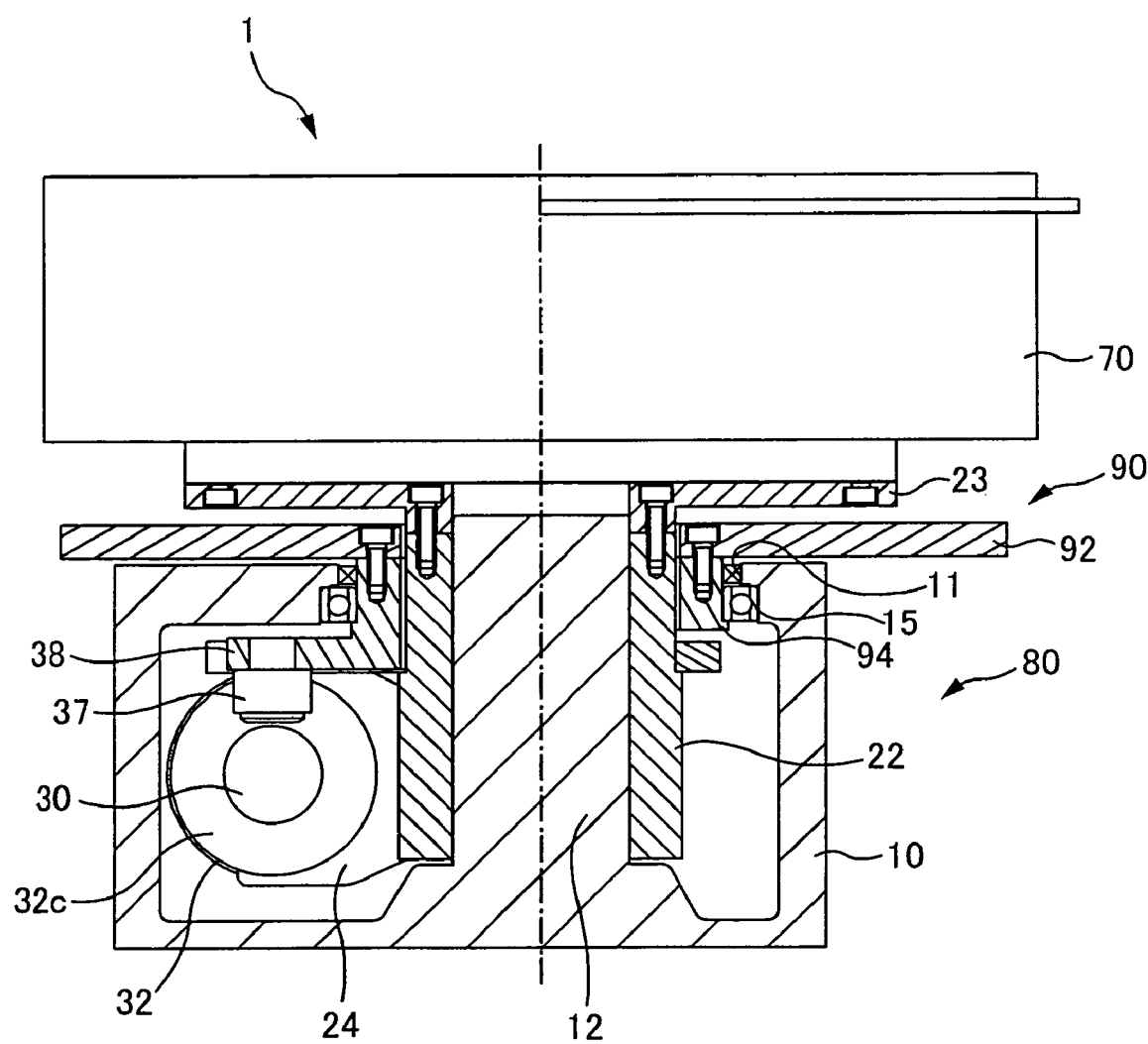
FIG. 6 is a vertical sectional view for explaining a cam mechanism for causing a weight to oscillate.
Figure 7:
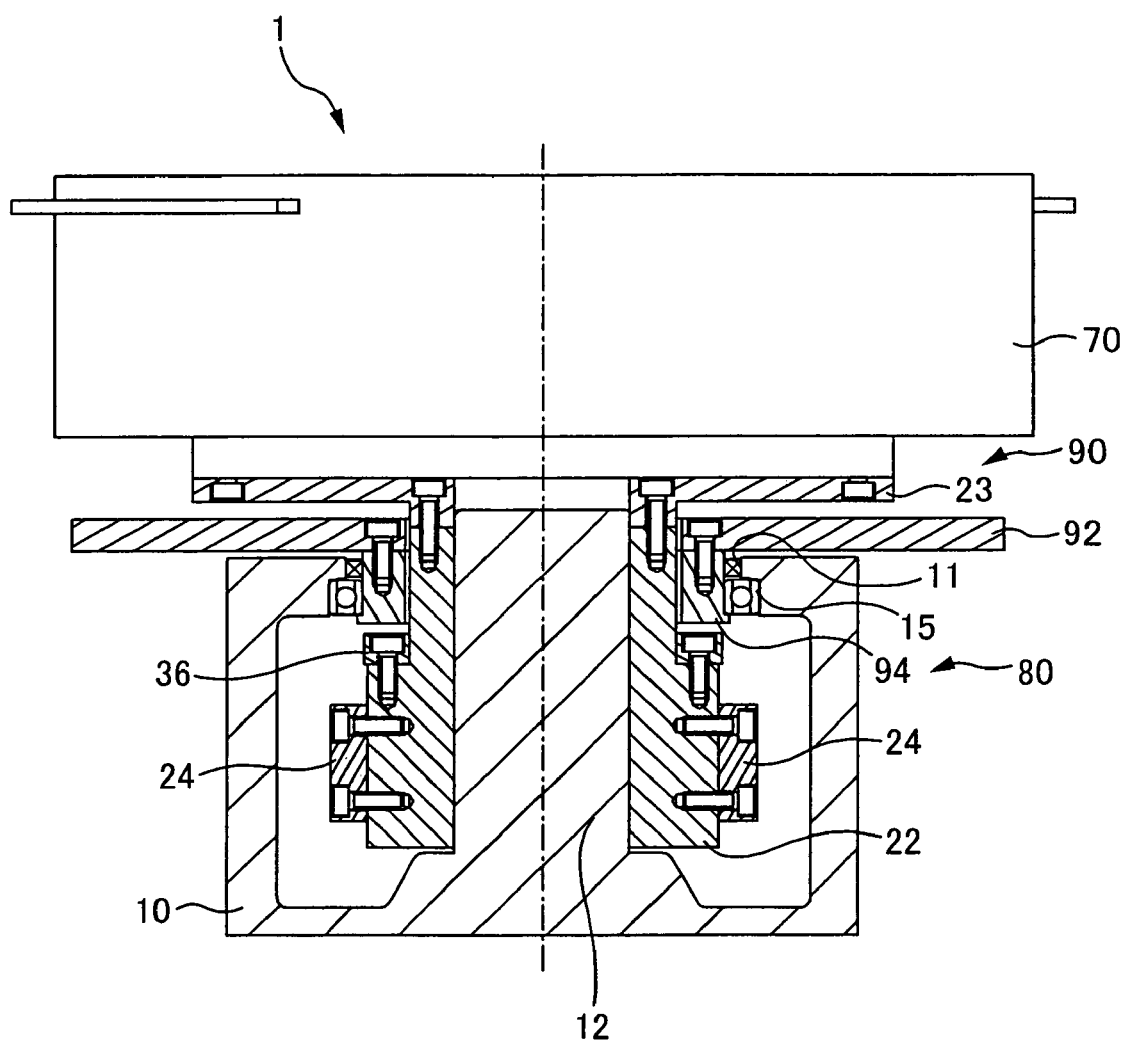
FIG. 7 is a cross-sectional view taken along the line A-A in FIG. 4.

A configuration of an article carrying apparatus according to the present embodiment is described by means of FIGS. 1A and 1B, FIG. 2, FIG. 3, FIG. 4, FIG. 5, FIG. 6, and FIG. 7. FIG. 1A is an external plan view of the article carrying apparatus, FIG. 1B is an external front view of FIG. 1A, FIG. 2 is a vertical sectional view for explaining the inside of a carry driving section, FIG. 3 is a plan cross-sectional view for explaining the inside of the carry driving section, FIG. 4 is a vertical sectional view for explaining a cam mechanism for causing a carry section to reciprocate, FIG. 5 is a cross-sectional view for explaining a cam mechanism for causing the carry section to oscillate, FIG. 6 is a vertical sectional view for explaining a cam mechanism for causing a weight to oscillate, and FIG. 7 is a cross-sectional view taken along the line A-A in FIG. 4.

A rotary feeder 1, which is the article carrying apparatus of the present embodiment, has a bowl 70 that is provided at the top thereof and that serves as the carry section, and a carry driving section 80 that is provided below the bowl and that is for applying vibration to the bowl 70 in order to carry an article.

The carry driving section 80 is enveloped in a housing 10 with three cam mechanisms provided inside thereof, and an output turret 22 for applying oscillating motion and vertical reciprocating motion to the bowl 70 and a balancer turret 94 for causing a weight 92 constituting a balancer 90, which is described below, to oscillate are projected upwardly through a circular opening 11 provided in the top of the housing 10. Moreover, on the bottom of the housing 10, a cylindrical, output turret support section 12 is installed upright along the vertical direction and concentrically with the opening 11, and the output turret 22 is provided turnably on the output turret support section 12. On the other hand, the balancer turret 94 is provided turnably on the inner circumference of the opening 11 via a bearing 15. That is, the output turret support section 12, the output turret 22, and the balancer turret 94 are arranged concentrically, while the balancer turret 94 is positioned outside the output turret 22, and the output turret 22 and the balancer turret 94 are configured so as to be turnable independently.

Moreover, a motor 40 serving as a drive source is fastened to a side of the housing 10, and a motor shaft is disposed in the horizontal direction and connected to an input shaft 30 provided within the housing 10.

The input shaft 30 is supported rotatably on the housing 10 via input shaft bearings 50, and disposed at the side of the output turret support section 12 along the horizontal direction. A pair of disk-shaped oscillating cams 32, constituting an output section oscillating cam mechanism and a balancer oscillating cam mechanism and each being provided with two types of cam faces, and a pair of constant diameter cams 34 constituting a reciprocating cam mechanism, which serves as an "other cam mechanism", are provided on the input shaft 30 with a spacing therebetween in the axial direction. Regarding the pair of constant diameter cams 34, one cam 34 each is provided closer to either end of the input shaft 30 than the pair of oscillating cams 32 so that the pair of oscillating cams 32 is disposed between the two cams 34. Regarding the pair of oscillating cams 32, cam faces 32a and 32b constituting the output section oscillating cam mechanism are each provided facing outward, that is, toward the constant diameter cam 34 side, and cam faces 32c and 32d constituting the balancer oscillating cam mechanism are each provided facing inward in the axial direction so as to be in opposition to the other.

The two cam faces 32a and 32b constituting the output section oscillating cam mechanism are respectively in contact with first cam followers 35a and 35b provided respectively on two first oscillating arms 36 that are fastened to the output turret 22 and elongated in the horizontal direction. The two oscillating arms 36 are arranged at a distance in the axial direction of the input shaft 30, and the first cam followers 35a and 35b are arranged so that the rotation axis of each cam follower is positioned vertically above the axis of the input shaft 30, and suspended from the first oscillating arms 36. The first cam follower 35a is in contact with the cam face 32a, and the first cam follower 35b is in contact with the cam face 32b. At this time, the two cam faces 32a and 32b are defined such that rotation of the input shaft 30 causes the contact positions of the first cam followers 35a and 35b to change by the same amount in the same direction in the axial direction. Consequently, when the input shaft 30 rotates, the first cam followers 35a and 35b move in the axial direction, and thus the bowl 70 fastened to the output turret 22 via an output section 23 can be oscillated.

The output section oscillating cam mechanism that is configured as described above also can create a pre-load state in which backlash is prevented from occurring, by arranging the two cam faces 32a and 32b provided on the input shaft 30 to be sandwiched between the pair of cam followers 35a and 35b provided in the output turret 22, and thus a high-precision cam mechanism can be realized.

The balancer 90 is constituted by the balancer oscillating cam mechanism and the weight 92. The two cam faces 32c and 32d constituting the balancer oscillating cam mechanism are in contact with a second cam follower 37 provided on a single second oscillating arm 38 that is fastened to the balancer turret 94 and elongated in the horizontal direction.

The oscillating arm 38 is disposed, with a spacing, between the two first oscillating arms 36 provided in the output turret 22, and the second cam follower 37 is disposed so that its rotation axis is positioned vertically above the axis of the input shaft 30, and suspended from the second oscillating arm 38. The second cam follower 37 is in contact with the cam faces 32c and 32d on both its sides in the axial direction. At this time, the two cam faces 32c and 32d are defined such that rotation of the input shaft 30 causes the second cam follower 37 to move in the direction opposite to the first cam followers 35a and 35b in the axial direction. Consequently, when the input shaft 30 rotates, the second cam follower 37 moves in the reverse direction of the moving direction of the first cam followers 35a and 35b, and thus the weight 92 fastened to the balancer turret 94 and having a predetermined mass can be oscillated.

The weight 92 is an annular weight plate that is fastened to the balancer turret 94, and formed in a concentric circular shape whose center matches with the center of oscillation of the output turret 22 and the balancer turret 94. This weight 92 is set so that the inertial force that occurs when the weight 92 oscillates cancels the inertial force that occurs when the bowl 70 oscillates. That is, the rotary feeder 1 of the present embodiment is capable of inhibiting vibration of the input shaft 30 by making a force that acts on the input shaft 30 from the output turret 22 via the first cam followers 35a and 35b and a force that acts on the input shaft 30 from the balancer turret 94 via the second cam follower 37 cancel each other.

Each constant diameter cam 34 has a cam face 34a formed on its outer circumferential surface along the rotating direction of the input shaft 30. Moreover, the output turret 22 is provided with lifting arms 24 each having at its front end a concave engagement section 24a opened toward the input shaft 30 side. The engagement section 24a engages with the cam face 34a of a constant diameter cam 34. Thus, the output turret 22 is caused to reciprocate in the vertical direction reliably based on the cam face 34a of the constant diameter cam 34. When the input shaft 30 rotates by approximately 60 degrees in the direction of the arrow from the state shown in FIG. 4, the output turret 22 is lowered by a predetermined amount relative to the housing 10, as shown by the dashed-dotted line. Moreover, when the input shaft 30 further rotates by approximately 60 degrees, the output turret 22 is raised to the state shown by the solid line.

When the output turret 22 is oscillated by the output section oscillating cam mechanism, the engagement section 24a slides with respect to the constant diameter cam 34 while engaging with that constant diameter cam 34. Therefore, oscillation of the output turret 22 does not prevent the effect of the constant diameter cam 34 to cause the output turret 22 to reciprocate in the vertical direction.

In the present embodiment, the bowl 70 is set so as to perform three cycles of reciprocation in the vertical direction while performing three cycles of oscillation, during a single rotation of the input shaft 30. Thus, the weight 92 is set so as to perform three cycles of oscillation in antiphase with the oscillation of the bowl 70, during a single rotation of the input shaft 30.

In the rotary feeder 1 constituted by the three cam mechanisms as described above, when the input shaft 30 is driven to rotate, the bowl 70 performs oscillation and reciprocation together with the output turret 22, and the weight 92, together with the balancer turret 94, performs oscillating motion in antiphase with the bowl 70. Since the oscillating motion of the bowl 70 is oscillation in the horizontal direction and the reciprocating motion thereof is reciprocation in the vertical direction, it is possible to carry the article placed in the bowl 70 by utilizing the effect of gravity. The configuration of the bowl 70 is similar to those conventionally known, so that the detailed description thereof is omitted.

Path of the Carry Section and Operation of the Balancer According to an Embodiment The operation of the bowl 70 and the balancer 90 according to the present embodiment is now described. It should be noted that the operation of the bowl 70 is described here with an example of a motion path that is achieved according to the setting of the cam curves of the cam faces 32a and 32b constituting the output section oscillating cam mechanism of the oscillating cams 32 and the cam curve of the constant diameter cams 34. Consequently, the operation of the bowl 70 is not limited to this motion path, and depending on the setting of the cam curves, a motion path that is suited to required parameters, such as the carrying capacity, can also be achieved, and the motion path of the balancer 90 can be set corresponding to that motion path of the bowl 70. In the description of the present embodiment, an example in which the article is carried in the clockwise direction is used. Thus, in the following description, the forward side and the rearward side from a predetermined position in the clockwise direction are expressed as the "front" and "rear", respectively.

Figure 8A:
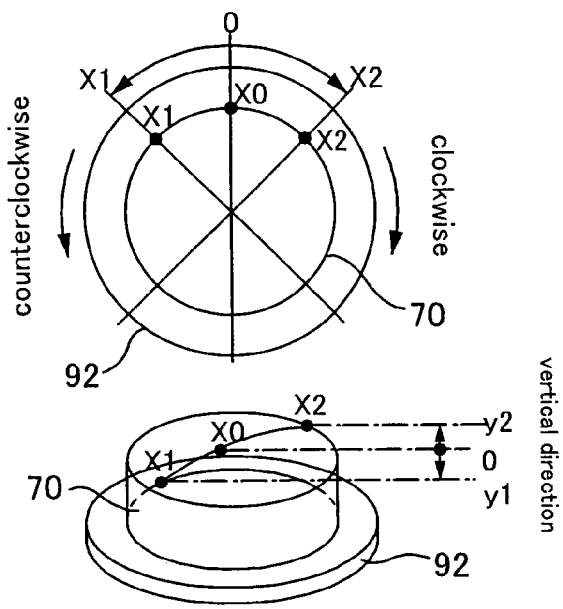
FIG. 8A is a diagram for explaining the concept of the operation of a bowl and the weight.
Figure 8B:
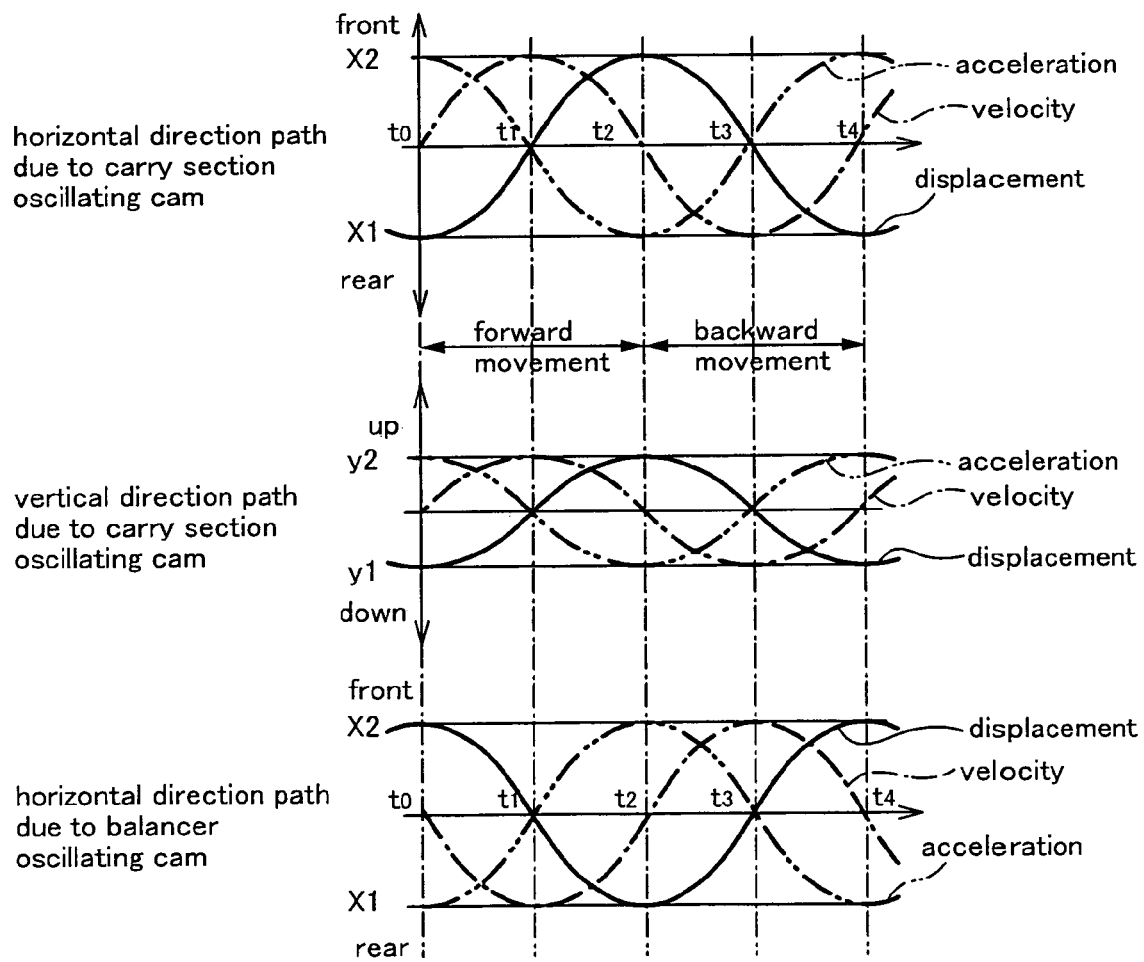
FIG. 8B is a diagram for explaining an example of a motion path applied to the bowl and the weight by the carry driving section.

FIG. 8A is a diagram for explaining the concept of the operation of the bowl 70 and the weight 92, and FIG. 8B is a diagram for explaining an example of a motion path applied to the bowl 70 and the weight 92 by the carry driving section 80. The uppermost stage of FIG. 8B is a timing chart of horizontal movement, which is the oscillating motion in the carrying direction of the bowl 70; the second stage from the top is a timing chart of vertical movement, which is the reciprocating motion in the vertical direction; and the third stage from the top is a timing chart of horizontal movement, which is the oscillating motion in the carrying direction of the weight 92. In the illustrated timing charts of the example of FIG. 8B, during a period of time in which the input shaft 30, i.e., the oscillating cams 32 and the constant diameter cams 34, makes 1/3 rotations, the bowl 70 performs a single cycle of oscillation in the carrying direction and the weight 92 performs a single cycle of oscillation in the opposite direction of the rotational movement direction of the bowl 70. The timing chart of the uppermost stage shows the horizontal movement displacement of the bowl 70 versus time; the timing chart of the second stage from the top shows the vertical movement displacement of the bowl 70 versus time; and the timing chart of the bottom stage shows the horizontal movement displacement of the weight 92 versus time. It should be noted that the three stage figures share an identical time axis. Here, a single cycle of oscillation refers to the operation of moving forward or backward and then moving backward or forward to return to the original position, and a single cycle of reciprocation refers to the operation of moving upward or downward and then moving downward or upward to return to the original position.

In this example, the description is made under the assumption that when the rotational motion is input to the input shaft 30 and the oscillating cams 32 and the constant diameter cams 34 rotate as a result, a given point of the bowl 70, which constitutes a single unit with the output turret 22, is caused to move in the horizontal direction and the vertical direction between X1(x1, y1) and X2(x2, y2). Moreover, the operation that the bowl 70 performs a single cycle of oscillation between X1 and X2 while the input shaft 30 is rotating continuously is described here. That is, a time point t0 shown in FIG. 8B represents a certain moment during continuous rotation of the input shaft 30, rather than representing a state in which the rotary feeder 1 is stopped. The bowl 70 at the time point t0 is in the position X1 located at one end (hereinafter, referred to as the "rearmost") of the region over which the bowl 70 can oscillate in the carrying direction and at the lowermost of the region over which the bowl 70 can move back and forth in the vertical direction. Moreover, the weight 92 is positioned at the other end (hereinafter, referred to as the "forefront") of the region over which the weight 92 can oscillate in the carrying direction.

At the time point t0 when the input shaft 30 is rotating, the bowl 70 starts to move clockwise in the carrying direction and upward in the vertical direction. At this time, the weight 92 starts to move counterclockwise.

At a time point t1, the bowl 70 moves rotationally to a position X0 that is the middle in the region over which it can oscillate in the carrying direction, and in the vertical direction, too, it arrives at the middle position in the region over which it can move back and forth. At this time, the weight 92 moves rotationally in the direction opposite to the bowl 70 to the middle position X0 in the region over which it can oscillate in the carrying direction.

When the input shaft 30 further rotates, at a time point t2, the bowl 70 moves rotationally to the position located at the forefront of the region over which it can oscillate in the carrying direction and arrives at the uppermost position X2 in the region over which it can move back and forth in the vertical direction. At this time, the weight 92 moves rotationally in the counterclockwise direction to the rearmost position in the region over which the weight 92 can oscillate in the carrying direction. That is, at the time point t2 when the bowl 70 has moved rotationally to the position X2 located at the forefront of the region over which it can oscillate in the carrying direction, the weight 92 has moved rotationally to the position X1 located at the rearmost of the region over which the weight 92 can oscillate in the carrying direction. At this time point t2, the rotational movement directions of the bowl 70 and the weight 92 are reversed, and they each start to move rotationally in the directions opposite to their previous rotational movement directions. That is, the bowl 70 starts to move rotationally toward X1, and the weight 92 starts to move rotationally toward X2.

After that, at a time point t3, the bowl 70 moves rotationally to the middle position in the region over which it can oscillate in the carrying direction, and in the vertical direction, too, it arrives at the middle position X0 in the region over which it can move back and forth. At this time, the weight 92 moves rotationally in the direction opposite to the bowl 70 to the middle position X0 in the region over which it can oscillate in the carrying direction.

Then, at a time point t4 when the input shaft 30 completes 1/3 rotations, the bowl 70 returns to the position X1 located at the rearmost of the region over which it can oscillate in the carrying direction and at the lowermost of the region over which the bowl 70 can move back and forth in the vertical direction. Moreover, the weight 92 moves rotationally in the clockwise direction to the forefront position in the region over which the weight 92 can oscillate in the carrying direction. That is, at the time point t4 when the bowl 70 has moved rotationally to the position X1 located at the rearmost of the region over which it can oscillate in the carrying direction, the weight 92 has moved rotationally to the position X2 located at the forefront of the region over which the weight 92 can oscillate in the carrying direction. That is, they have returned to the same state they were in at the time point t0. At the time points t0 and t4, the rotational movement directions of the bowl 70 and the weight 92 are reversed, and they each start to move rotationally in the directions opposite to their previous rotational movement directions. That is, the bowl 70 starts to move rotationally toward X2, and the weight 92 starts to move rotationally toward X1.

Forces Acting on Input Shaft Due to Cam Mechanisms and Balancer

Figure 9A:
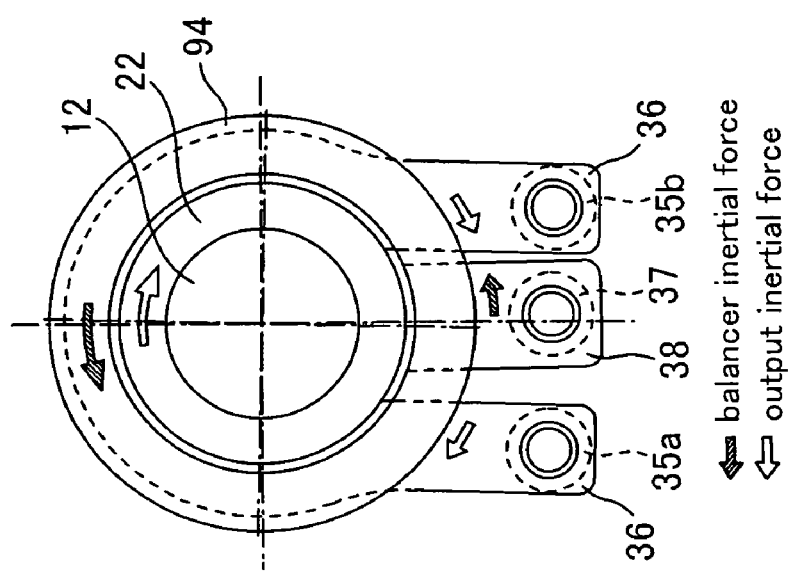
FIG. 9A is a diagram for explaining the phase of an output turret and a balancer turret at time points t0 and t4.
Figure 9B:
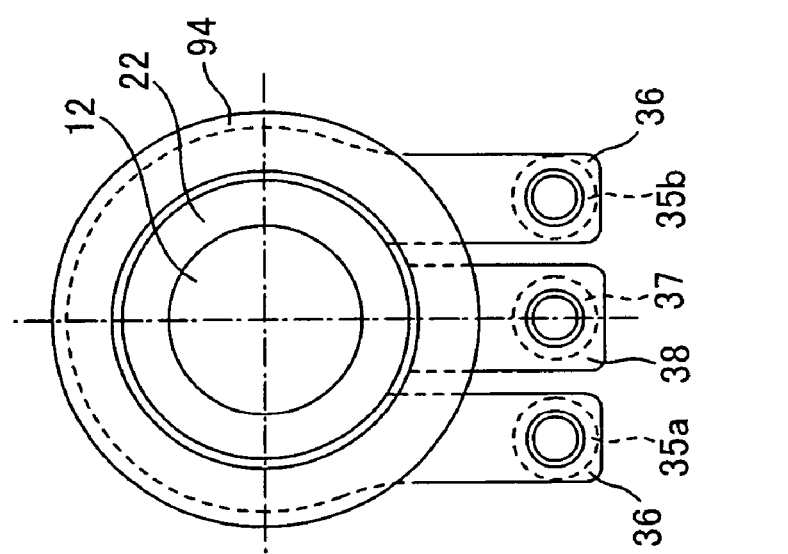
FIG. 9B is a diagram for explaining the phase of the output turret and the balancer turret at time points t1 and t3.
Figure 9C:
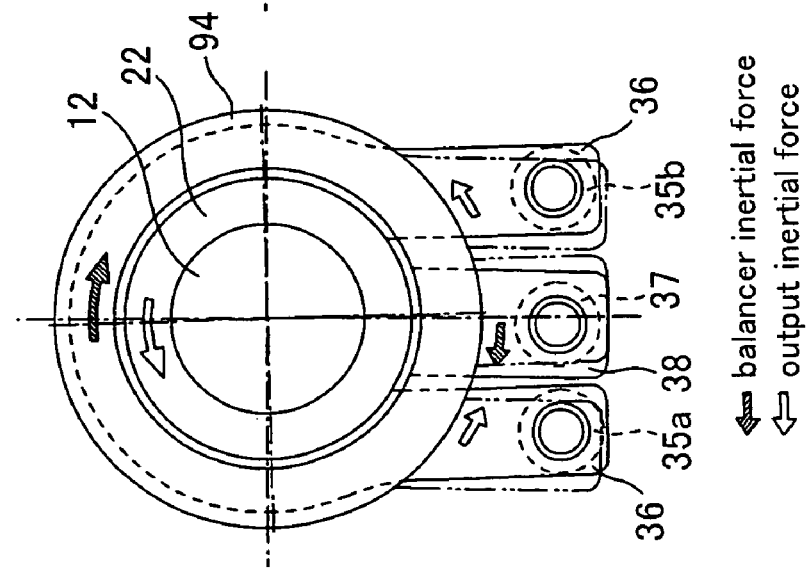
FIG. 9C is a diagram for explaining the phase of the output turret and the balancer turret at a time point t2.

Next, forces acting on the input shaft 30 due to the cam mechanisms and the balancer 90 are described with regard to each of the time points t0 to t4. FIG. 9A is a diagram for explaining the phase of the output turret and the balancer turret at the time points t0 and t4, FIG. 9B is a diagram for explaining the phase of the output turret and the balancer turret at the time points t1 and t3, and FIG. 9C is a diagram for explaining the phase of the output turret and the balancer turret at the time point t2.

At the time point t0, the bowl 70 is in a state in which the rotational backward movement in the carrying direction changes to the rotational forward movement, that is, a state in which its rotational movement direction is reversed. Thus, the acceleration of the bowl 70 in the carrying direction is at the maximum, and the inertial force that acts rearward is greatest. On the other hand, in the vertical direction, the bowl 70 is in a state in which the downward movement in the vertical direction changes to the upward movement. Thus, the acceleration of the bowl 70 in the vertical direction is at the maximum, and the inertial force that acts downward is greatest. That is, it acts to increase the friction between the article and the bowl 70, and thus the article moves together with the bowl 70, rather than sliding over the upper face of the bowl 70. Moreover, at the time point t0, the weight 92 is in a state in which the rotational forward movement in the carrying direction changes to the rotational backward movement, that is, a state in which its rotational movement direction is reversed. For this reason, the acceleration of the weight 92 in the carrying direction is at the maximum, and the inertial force that acts forward is greatest.

At the time point t0, the inertial force (hereinafter, referred to as "output inertial force") that occurs when the bowl 70, the output section 23, the output turret 22, and the like move rotationally in a single unit with the bowl 70 is transmitted to the cam follower 35a via the output turret 22 and the first oscillating arm 36, and acts so that the cam follower 35a is pressed against the cam face 32a. On the other hand, the inertial force (hereinafter, referred to as "balancer inertial force") that occurs when the weight 92, the balancer turret 94, and the like move rotationally in a single unit with the weight 92 is transmitted to the cam follower 37 via the balancer turret 94 and the second oscillating arm 38, and acts so that the cam follower 37 is pressed against the cam face 32c. At this time, the output inertial force that acts on the cam face 32a and the balancer inertial force that acts on the cam face 32c act in opposite directions, and therefore cancel each other (FIG. 9A). For this reason, by setting the mass, outer diameter, and the like of the weight 92 so that the output inertial force and the balancer inertial force are made equal, the force resulting from the motion for applying vibration to the bowl 70 and acting on the input shaft 30 is inhibited.

At the time point t1, the bowl 70 is in the middle position in the region over which it can oscillate in the carrying direction, and the velocity of the forward movement is at the maximum, so that acceleration is "0". For this reason, the inertial force of the bowl 70 that acts in the carrying direction is "0". Moreover, in the vertical direction, since the bowl 70 is being raised, that is, in the middle position in the distance over which the bowl 70 can move, the velocity of the upward movement is at the maximum and acceleration is "0", so that the inertial force in the vertical direction is "0". Moreover, the weight 92 is in the middle position in the region over which it can oscillate in the carrying direction, and the velocity of the backward movement is at the maximum, so that acceleration is "0". For this reason, the inertial force of the weight 92 that acts in the carrying direction is "0" (FIG. 9B).

At the time point t2, the bowl 70 is in a state in which the rotational forward movement in the carrying direction changes to the rotational backward movement, that is, a state in which its rotational movement direction is reversed. Thus, the acceleration of the bowl 70 in the carrying direction is at the maximum, and the inertial force that acts forward is greatest. On the other hand, in the vertical direction, the bowl 70 is in a state in which the upward movement in the vertical direction changes to the downward movement. Thus, the acceleration of the bowl 70 in the vertical direction is at the maximum, and the inertial force that acts upward is greatest. That is, the friction between the article and the bowl 70 is decreased, and thus the bowl 70 rotationally moves counterclockwise while the article slides over the upper face of the bowl 70. Moreover, at the time point t2, the weight 92 is in a state in which the rotational backward movement in the carrying direction changes to the rotational forward movement, that is, a state in which its rotational movement direction is reversed. For this reason, the acceleration of the weight 92 in the carrying direction is at the maximum, and the inertial force that acts rearward is greatest.

At the time point t2, the output inertial force that occurs when the bowl 70, the output section 23, the output turret 22, and the like move rotationally in a single unit with the bowl 70 is transmitted to the cam follower 35b via the output turret 22 and the first oscillating arm 36, and acts so that the cam follower 35b is pressed against the cam face 32b. On the other hand, the balancer inertial force that occurs when the weight 92, the balancer turret 94, and the like move rotationally in a single unit with the weight 92 is transmitted to the cam follower 37 via the balancer turret 94 and the second oscillating arm 38, and acts so that the cam follower 37 is pressed against the cam face 32d. At this time, the output inertial force that acts on the cam face 32b and the balancer inertial force that acts on the cam face 32d act in opposite directions, and therefore cancel each other (FIG. 9C). Thus, as at the time point t0, the force resulting from the motion for applying vibration to the bowl 70 and acting on the input shaft 30 is inhibited.

At the time point t3, the bowl 70 is in the middle position in the region over which it can oscillate in the carrying direction, and the velocity of the backward movement is at the maximum, so that acceleration is "0". Thus, the inertial force of the bowl 70 that acts in the carrying direction is "0". Moreover, in the vertical direction, since the bowl 70 is being lowered, that is, it is in the middle position in the distance over which the bowl 70 can move, the velocity of the downward movement is at the maximum and acceleration is "0", so that the inertial force in the vertical direction is "0". Moreover, the weight 92 is in the middle position in the region over which it can oscillate in the carrying direction, and the velocity of the forward movement is at the maximum, so that acceleration is "0". For this reason, the inertial force of the weight 92 that acts in the carrying direction is "0" (FIG. 9B).

At the time point t4, both the bowl 70 and the weight 92 have returned to the same state as at the time point t0 (FIG. 9A).

In other words, in a state in which the balancer 90 is not provided, only the output inertial force resulting from the oscillating motion of the bowl 70 acts on the input shaft 30. Thus, the output inertial force resulting from the oscillating motion of the bowl 70, with its peak at the time points t0 and t2, acts on the input shaft 30 via the first oscillating arms and the cam followers 35a and 35b. For this reason, in a rotary feeder 1 that is not provided with the balancer 90, the entire apparatus vibrates because of the oscillating motion of the bowl 70. On the other hand, the rotary feeder 1 according to the present embodiment is capable of inhibiting the vibration of the entire apparatus by inhibiting, with the balancer 90, the force that acts on the input shaft 30 when vibration is applied to the bowl 70 in order to carry the article. In the rotary feeder 1 according to the present embodiment, the weight 92 having a predetermined mass of the balancer 90 is oscillated in the opposite direction from the oscillating motion of the bowl 70 as described above, and as a result the forces respectively resulting from the oscillation of the bowl 70 and the balancer 90 are cancelled by each other. That is, by generating the inertial force that cancels the output inertial force using the balancer 90, the force that acts on the input shaft 30 when vibration is applied to the bowl 70 in order to carry the article is reduced, and therefore, the input shaft 30 is less prone to vibration. Thus, vibration of the entire rotary feeder 1 is inhibited, and the article can be carried properly. Furthermore, generation of noise due to vibration also can be inhibited.

Moreover, since a driving force for driving the balancer 90 is input from the input shaft 30, the balancer 90 can be operated by rotating the input shaft 30, which is for inputting the driving force to the output section oscillating cam mechanism for causing the bowl 70 to perform oscillating motion. That is, it is not necessary to provide separately an input section for the driving force for operating the balancer 90, and the balancer 90 can be operated with a simple configuration. In particular, the phases of the oscillating motion of the bowl 70 and the oscillating motion of the balancer 90 have to be matched in order to make the bowl 70 and the weight 90 oscillate in opposite directions; because the balancer 90 is driven by the driving force that is input from the same input shaft 30 as the output section oscillating cam mechanism, the phases of the oscillating motion of the bowl 70 and the oscillating motion of the balancer 90 can be matched easily and appropriately. Furthermore, since the output inertial force resulting from the oscillating motion of the bowl 70 and the balancer inertial force resulting from the oscillating motion of the weight 92 independently act on the input shaft 30, these reaction forces cancel each other, and thus the force that acts on the input shaft 30 when vibration is applied to the bowl 70 can be inhibited reliably.

Furthermore, even when the bowl 70 and the weight 92 perform oscillating motion repeatedly, the phase of the bowl 70 matches with the phase of the weight 92, so that vibration can be inhibited continuously even when the rotary feeder 1 is operated continuously.

In the rotary feeder 1 according to the present embodiment, the bowl 70 is oscillated while the two outward-facing cam faces 32a and 32b of the pair of oscillating cams 32 provided in the axial direction of the input shaft 30 with a spacing therebetween are respectively in contact with the first cam followers 35a and 35b provided on the bowl 70 via the output turret 22, so that a cam constituted by the two cam faces 32a and 32b is sandwiched between the two first cam followers 35a and 35b. For this reason, the bowl 70 can be oscillated with high precision by the cam mechanism that does not lead to occurrence of backlash. Moreover, the two inward-facing cam faces 32c and 32d of the pair of oscillating cams 32 are in contact with the second cam follower 37 provided on the weight 92 via the balancer turret 94, so that the second cam follower 37 of the weight 92 is sandwiched between the two cam faces 32c and 32d while contacting them. For this reason, the weight 92 can be oscillated with high precision by a cam mechanism that does not lead to occurrence of backlash. That is, vibration due to backlash does not occur neither when the bowl 70 oscillates nor when the weight 92 oscillates. Furthermore, since the two cam mechanisms are configured in such a manner that they share the pair of oscillating cams 32, the size of the cam mechanisms can be reduced.

Furthermore, in the rotary feeder 1 according to the present embodiment, the bowl 70 is caused to perform reciprocating motion in the vertical direction by the constant diameter cam mechanism, so that it is possible to change the normal force exerted on the carry face of the bowl 70 by the article when the article is carried. Thus, it is possible to carry the article efficiently by changing the friction between the article and the carry face.

Moreover, it is possible to cause the bowl 70 to perform reciprocating motion in the vertical direction by rotating the input shaft 30, which is for inputting the driving force to the output section oscillating cam mechanism for causing the bowl 70 to perform oscillating motion. That is, it is not necessary to provide separately an input section for a driving force for causing the bowl 70 to perform reciprocating motion in the vertical direction, and the bowl 70 can be caused to perform reciprocating motion in the vertical direction with a simple configuration. Furthermore, since the driving forces for the oscillating motion and the reciprocating motion of the bowl 70 are input from the same input shaft 30, the timings of the oscillating motion and the reciprocating motion of the bowl 70 can be tuned easily and appropriately, and thus the article can be carried efficiently.

The rotary feeder 1 according to the present embodiment has a configuration including the balancer 90 for generating the inertial force acting in such a direction that the output inertial force occurring during oscillation of the bowl 70 is cancelled, as a measure for inhibiting the force that acts on the input shaft 30 when vibration is applied to the bowl 70 in order to carry the article. Then, both the bowl 70 and the weight 92 of the balancer 90 are driven by the driving force of the motor that is input from the input shaft 30. Thus, the required torque of the motor 40 of the rotary feeder 1 becomes about twice the capacity compared to that when the balancer 90 is not provided. For this reason, by providing the balancer 90, the size of the motor increases, and the size of the entire rotary feeder 1 also increases. To address this problem, in order to reduce the required torque of the motor, an inhibitory member for inhibiting the inertial force resulting from oscillation of the bowl 70 and the weight 92 may be provided between the bowl 70 and the weight 92.

Variant Example of Rotary Feeder

Figure 10:
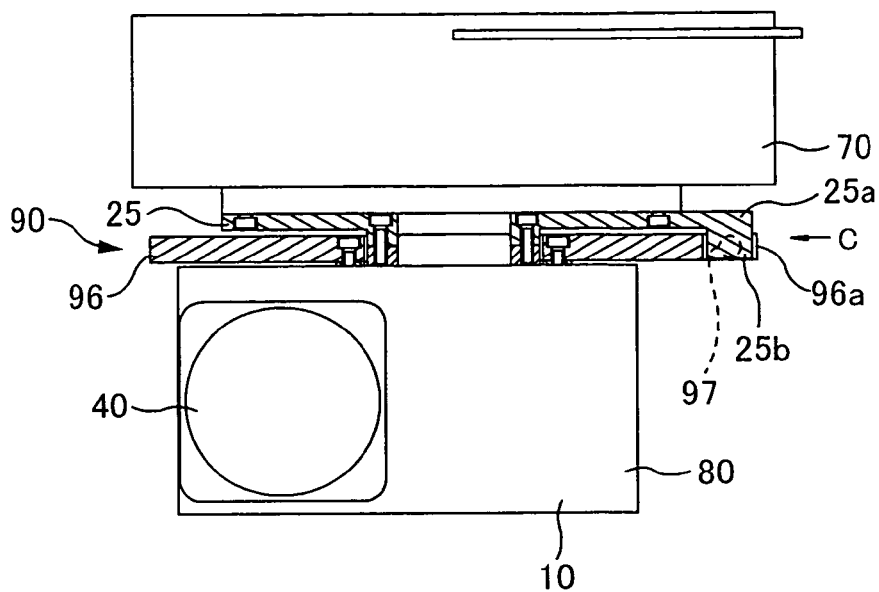
FIG. 10 is a diagram for explaining, as a variant example of a rotary feeder, a configuration in which an inhibitory member is provided between the bowl and the weight.
Figure 11:
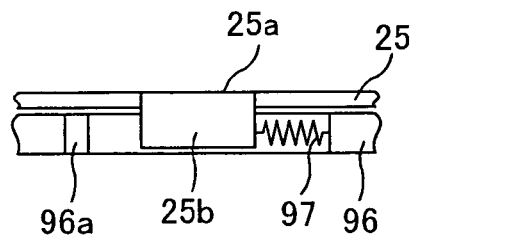
FIG. 11 is a view from the arrow direction C in FIG. 10.
Figure 12:
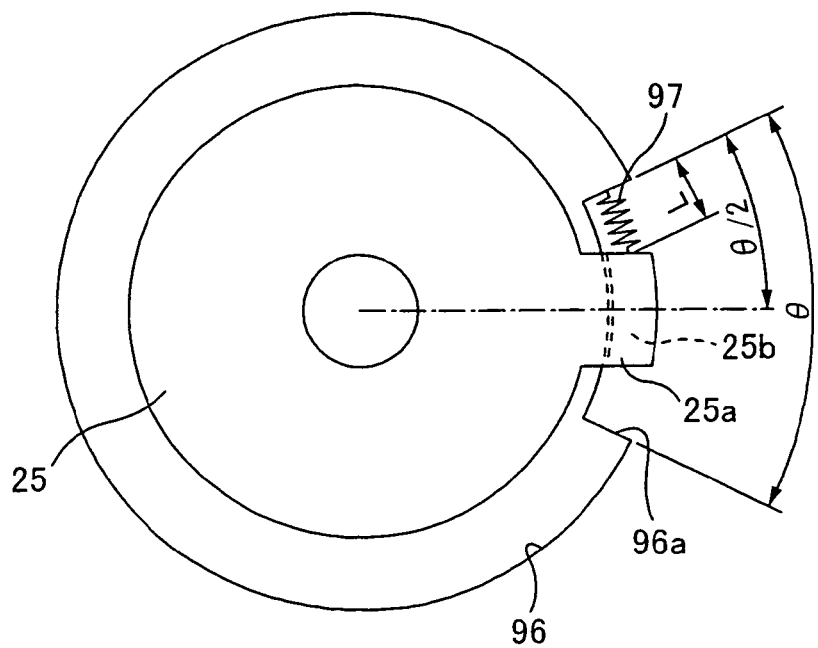
FIG. 12 is a plan view showing a positional relationship between the bowl, the weight, and the inhibitory member.

FIG. 10 is a diagram for explaining a configuration, which is a variant example of the rotary feeder, in which an inhibitory member is provided between the bowl 70 and a weight, FIG. 11 is a view from the arrow direction C in FIG. 10, FIG. 12 is a plan view showing the positional relationship between the bowl 70, the weight, and the inhibitory member, and FIG. 13 is a diagram for explaining the effect of the inhibitory member. In FIGS. 10 to 13, the same components as those in the above-described embodiment are assigned the same reference numerals.

In a rotary feeder 2 of this variant example, a portion in the circumferential direction of the outer edge of a weight 96 constituting the balancer 90 is cut out toward the center by a predetermined angle to form a recess 96a. Moreover, a portion in the circumferential direction of the outer edge of an output section 25 provided between the bowl 70 and the output turret 22 includes a projecting arm 25a that projects outwardly, and the projecting arm 25a includes at its front-end side a biasing section 25b that is suspended downwardly. When assembled into the rotary feeder 2, the output section 25 and the weight 96 are formed so as to oscillate around the same center of oscillation, and the biasing section 25b of the output section 25 that is positioned above the weight 96 is inserted in the recess 96a of the weight 96. That is, the biasing section 25b is configured so as to move in the circumferential direction within the area of the recess 96a when the output section 25 and the weight 96 oscillate. For this reason, the angle θ that the recess 96a is cut out is sufficiently wider than the angle that the bowl 70 oscillates when the article is carried. Then, a coiled spring 97 is provided between the biasing section 25b and the recess 96a along the circumferential direction of a circle whose center matches with the above-described center of oscillation. This coiled spring 97 is set so as to have a free length L when the center in the circumferential direction of the projecting arm 25a of the output section 25 is positioned at the center (θ/2) in the circumferential direction of the recess 96a, and provided in one of the gaps between the biasing section 25b and the recess 96a.

In this variant example, the coiled spring 97 is set so as to act in such a direction that it is extended when the bowl 70 rotationally moves clockwise and the weight 96 rotationally moves counterclockwise and to act in such a direction that it is compressed when the bowl 70 rotationally moves counterclockwise and the weight 96 rotationally moves clockwise.

Next, the effect of the coiled spring 97 serving as the inhibitory member is described by means of FIG. 8 and FIG. 13. FIG. 13A is a diagram for explaining forces that act immediately before the time point t0 and the time point t4 in FIG. 8 and before the rotational movement directions are reversed, FIG. 13B is a diagram for explaining forces that act immediately after the time point t0 and the time point t4 in FIG. 8 and after the rotational movement directions are reversed, FIG. 13C is a diagram for explaining forces that act immediately before the time point t2 in FIG. 8 and before the rotational movement directions are reversed, and FIG. 13D is a diagram for explaining forces that act immediately after the time point t2 in FIG. 8 and after the rotational movement directions are reversed. In the following description, the description of the reciprocating motion in the vertical direction is omitted because it is the same as in the above-described embodiment. Here, the description is made with regard to the time points t0, t2, and t4 when the required torque of the motor 40 is greatest.

Figure 13B:
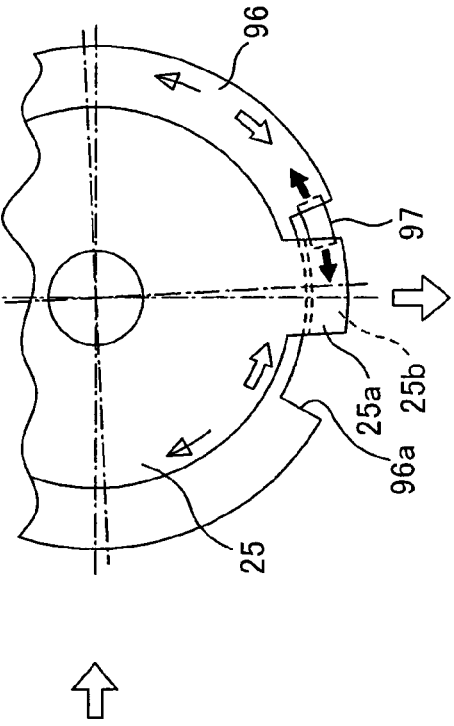
FIG. 13 is a diagram for explaining an effect of the inhibitory member.
Figure 13C:
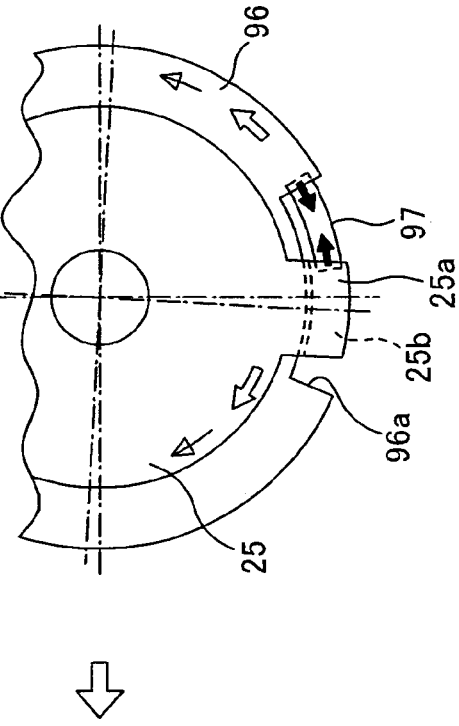
Figure 13A:
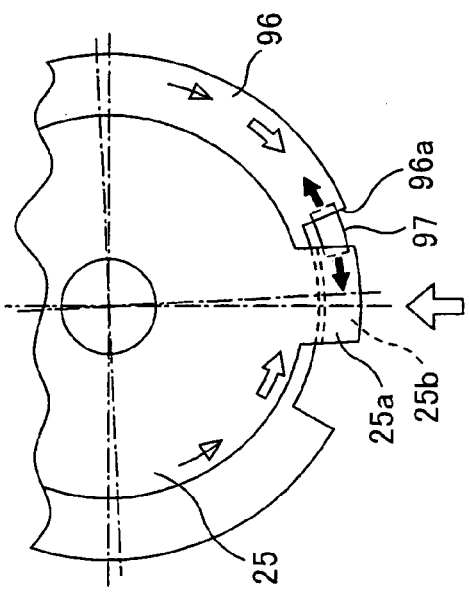

At the time points t0 and t4, the bowl 70 is in a state in which the counterclockwise, rotational backward movement in the carrying direction changes to the clockwise, rotational forward movement, that is, a state in which its rotational movement direction is reversed and changed from FIG. 13A to FIG. 13B, so that the output inertial force that acts in the counterclockwise direction is greatest. Moreover, the weight 96 at the time point t0 is in a state in which the clockwise, rotational forward movement in the carrying direction changes to the counterclockwise, rotational backward movement, that is, a state in which its rotational movement direction is reversed, so that the balancer inertial force that acts in the clockwise direction is greatest. At this time, the biasing section 25b of the output section 25 is positioned at the rearmost within the area of the recess 96a of the weight 96, and the distance of the gap between the biasing section 25b and the recess 96a, in which the coiled spring 97 is provided, is minimized. Thus, the coiled spring 97 is most compressed, and has accumulated an energy in the extending direction. Then, the force that acts in such a direction that the coiled spring 97 is compressed is removed at the timing when the bowl 70 reverses its rotational movement direction, so that the force of the coiled spring 97 acts in the direction in which it extends. At this time, the extending force of the coiled spring 97 acts on the biasing section 25b and the recess 96a in the directions opposite to the output inertial force and the balancer inertial force, respectively, so as to cancel the output inertial force and the balancer inertial force.

Figure 13D:
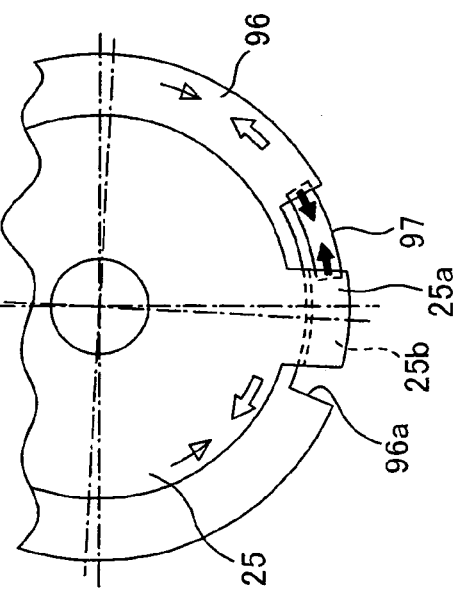

At the time point t2, the bowl 70 is in a state in which the clockwise, rotational forward movement in the carrying direction changes to the counterclockwise, rotational backward movement, that is, a state in which its rotational movement direction is reversed and changed from FIG. 13C to FIG. 13D, so that the output inertial force that acts in the clockwise direction is greatest. Moreover, the weight 96 at the time point t2 is in a state in which the counterclockwise, rotational backward movement in the carrying direction changes to the clockwise, rotational forward movement, that is, a state in which its rotational movement direction is reversed, so that the balancer inertial force that acts in the counterclockwise direction is greatest. At this time, the biasing section 25b of the output section 25 is positioned at the forefront within the area of the recess 96a of the weight 96, and the distance of the gap between the biasing section 25b and the recess 96a, in which the coiled spring 97 is provided, is maximized. Thus, the coiled spring 97 is most extended, and has accumulated an energy in the compressing direction. Then, the force that acts in such a direction that the coiled spring 97 is extended is removed at the timing when the bowl 70 reverses its rotational movement direction, so that the force of the coiled spring 97 acts in the direction in which it shrinks. At this time, the shrinking force of the coiled spring 97 acts on the biasing section 25b and the recess 96a in the directions opposite to the output inertial force and the balancer inertial force, respectively, so as to cancel the output inertial force and the balancer inertial force.

In other words, when the coiled spring 97 is not provided, the output inertial force and the balancer inertial force act in opposite directions to each other when the oscillating directions of the oscillating motion of the bowl 70 and the oscillating motion of the weight 96 are reversed, and thus about twice the torque in the case where the balancer is not provided becomes necessary. For this reason, a considerable amount of driving force is required when, and before and after, the oscillating directions are reversed, and therefore the size of the entire rotary feeder 1 including the drive source such as the motor is increased. On the other hand, by employing a configuration having the coiled spring 97 for inhibiting the output inertial force resulting from the oscillating motion of the bowl 70 and the balancer inertial force resulting from the oscillating motion of the weight 96, it is possible to reduce the required maximum driving force, and to reduce the size of the motor 40 and the rotary feeder 1.

In particular, since the coiled spring 97 serving as the inhibitory member is provided between the output section 25 to which the bowl 70 is secured and the weight 96, when a predetermined position of the bowl 70 and a predetermined position of the weight 96 are displaced relative to the other in such a direction that the distance therebetween is increased in the circumferential direction, the coiled spring 97 is extended between the bowl 70 and the weight 96 in conjunction with this relative displacement to act to pull the bowl 70 and the weight 96 closer to each other, whereas when the predetermined position of the bowl 70 and the predetermined position of the weight 96 are displaced relative to the other in such a direction that the distance therebetween is decreased, the coiled spring 97 is compressed between the bowl 70 and the weight 96 in conjunction with this relative displacement to act to push the bowl 70 and the weight 96 apart. Thus, when the distance between the predetermined position of the bowl 70 and the predetermined position of the weight 96 is maximized and when that distance is minimized, in which cases the driving force is most required, the force that acts in such a direction that the predetermined position of the bowl 70 and the predetermined position of the weight 96 are returned to their original positions becomes the greatest; therefore, the output inertial force resulting from the oscillating motion of the bowl 70 and the balancer inertial force resulting from the oscillating motion of the weight 96 can be inhibited efficiently.

Moreover, since the oscillating motion of the bowl 70 and the oscillating motion of the weight 96 have the same center of oscillation and the coiled spring 97 acts within the circumference of a circle whose center matches with the center of oscillation and on which the output inertial force and the balancer inertial force are exerted, forces that act in directions other than the circumferential direction are prevented from occurring. Thus, unwanted vibration does not occur, and therefore it is possible to vibrate the bowl 70 efficiently.

In the description of the present embodiment, an example in which the coiled spring 97 serving as the inhibitory member is provided between the bowl 70 and the weight 96 was used. However, the inhibitory member is not limited to this. FIGS. 14A to 14E show variant examples of the inhibitory member.

FIG. 14A is a diagram showing a variant example in which the projecting arm 25a of the output section 25 and the weight 96 are connected vertically by a bar-like, elastic member 98a. Here, the bar-like, elastic member 98a can be a member having elasticity, such as rubber, steel rod, or plastic.

FIG. 14B is a diagram showing a variant example in which the projecting arm 25a of the output section 25 and the weight 96 are connected by a wire 98b that is made of steel or plastic, for example, and that is formed into a shape that is susceptible to elastic deformation. At this time, the ends of the wire 98b to be fastened respectively to the projecting arm 25a and the weight 96 are preferably provided on the circumference of a circle whose center matches with the center of oscillation.

FIG. 14C is a diagram showing a variant example in which the output section 25 and the weight 96 are connected in the diametrical direction by an elastic material 98c. Here, the elastic member 98c can be formed of a plate material having elasticity, such as rubber, steel rod, or plastic, and the inertial force can be inhibited by bending the elastic member 98c in the plate thickness direction by the relative displacement of the output section 25 and the weight 96.

FIG. 14D is a diagram showing a variant example utilizing the repulsion between magnets. In this case, magnets 95 are installed on one of the faces of the projecting arm 25a of the output section 25 and a face of the recess 96a of the weight 96 in opposition to that face, and also on the other face of the projecting arm 25a and a face of the recess 96a of the weight 96 in opposition to that face, with the faces of the magnets 95 having the same polarity facing each other. The configuration is such that the magnets repel each other when the projecting arm 25a and the recess 96a of the weight 96 come close to the other.

In FIG. 14E, helical compression springs 99 are provided between one of the faces of the projecting arm 25a of the output section 25 and a face of the recess 96a of the weight 96 in opposition to that face, and between the other face of the projecting arm 25a and a face of the recess 96a of the weight 96 in opposition to that face, with a compressive force applied to each spring. That is, the two helical compression springs 99 push the projecting arm 25a from both sides in the circumferential direction of the projecting arm 25a of the output section 25, thereby supporting the projecting arm 25a, and thus a stable force can be provided. Moreover, by adjusting the amount of compression, it is possible to operate the bowl 70 such that the range of its oscillation is limited to within the range of compression of the helical compression springs 99, and thus a more stable force can be provided.

In addition to these, it is also possible, for example, to provide an air spring, such as one constituted by a cylinder and a piston, between one of the faces of the projecting arm and a face of the recess of the weight in opposition to that face and also between the other face of the projecting arm and a face of the recess of the weight in opposition to that face.

In the description of the present embodiment, a configuration in which a single drive source is used in common for the three cam mechanisms, that is, a configuration in which the motion from a single drive source is input to the cam mechanisms via a single input shaft 30 was used as an example. However, this is not a limitation. For example, it is also possible to provide a dedicated drive source for each or any of the three cam mechanisms.

However, the configuration in which a single drive source is used in common is preferable. This is because a same input motion allows the oscillating motion due to the output section oscillating cam mechanism, the oscillating motion due to the balancer cam mechanism, and the reciprocating motion due to the constant diameter cam mechanism to be synchronized with ease.

In the present embodiment, the lifting arms 24 were secured to the output turret 22 by screws. However, it is also possible to process and form the lifting arms 24 integrally with the output turret 22.

OTHER EMBODIMENTS

An embodiment of the present invention was described above, but the present invention is not limited to this embodiment, and modifications such as the following also are possible.

In the embodiment of the present invention, two constant diameter cam mechanisms were respectively provided at the end portions of the input shaft 30 in the axial direction, but the number provided and the location(s) provided are not limited to this, and it is also possible to provide a single or three or more constant diameter cam mechanisms. However, from the standpoint of stability in supporting the output section 23, it is preferable that at least two are furnished to provide multiple point support at two or more points, and it is preferable that they are disposed as far apart as possible.

Although the preferred embodiments of the present invention have been described in detail, it should be understood that various changes, substitutions and alterations can be made therein without departing from spirit and scope of the inventions as defined by the appended claims.

What is claimed is:

1. An article carrying apparatus comprising:
   a carry section for restricting, to a circumferential direction, a carrying direction in which an article is carried;
   a cam mechanism to which a driving force is input from an input shaft and that is for applying a vibration to said carry section by transmitting, to said carry section, an oscillating motion having at least a circumferential direction component in said circumferential direction, wherein said vibration causes said article to be carried in said circumferential direction; and
   a balancer for inhibiting a force that acts on said input shaft due to said cam mechanism applying said vibration to said carry section,
   wherein said input shaft has a first cam and a second cam provided with a spacing therebetween in an axial direction of said input shaft, each of said first cam and said second cam having two types of cam faces;
   wherein a first cam face of said first cam faces a first cam face of said second cam; and
   wherein of the four cam faces of said first cam and said second cam,
   a second cam face of said first cam and a second cam face of said second cam are respectively in contact with cam followers provided to said carry section, and said first cam face of said first cam and said first cam face of said second cam are in contact with a cam follower provided to said balancer.

2. An article carrying apparatus according to claim 1, wherein said balancer is a mechanism in which a weight having a predetermined mass performs an oscillating motion in a direction opposite to said oscillating motion of said carry section.

3. An article carrying apparatus according to claim 2, wherein a cycle of said oscillating motion of said carry section matches with a cycle of said oscillating motion of said weight.

4. An article carrying apparatus according to claim 2, comprising an inhibitory member for inhibiting an inertial force resulting from said oscillating motion of said carry section and an inertial force resulting from said oscillating motion of said weight.

5. An article carrying apparatus according to claim 4, wherein said inhibitory member is provided between said carry section and said weight, and is an elastic member for generating a force that acts on said carry section and said weight according to a relative displacement of said carry section and said weight.

6. An article carrying apparatus according to claim 4, wherein said article carrying apparatus is configured so that a center of oscillation of said oscillating motion of said carry section and a center of oscillation of said oscillating motion of said weight are concentric, and said inhibitory member acts in a circumference of a circle whose center matches with said center of oscillation.

7. An article carrying apparatus according to claim 1, comprising an other cam mechanism for applying a vibration to said carry section by transmitting, to said carry section, a reciprocating motion having at least a vertical direction component.

8. An article carrying apparatus according to claim 7, wherein a driving force for driving said other cam mechanism is input from said input shaft.

9. An article carrying apparatus according to claim 1, wherein a driving force for driving said balancer is input from said input shaft.

* * * * *